Patented May 29, 1951

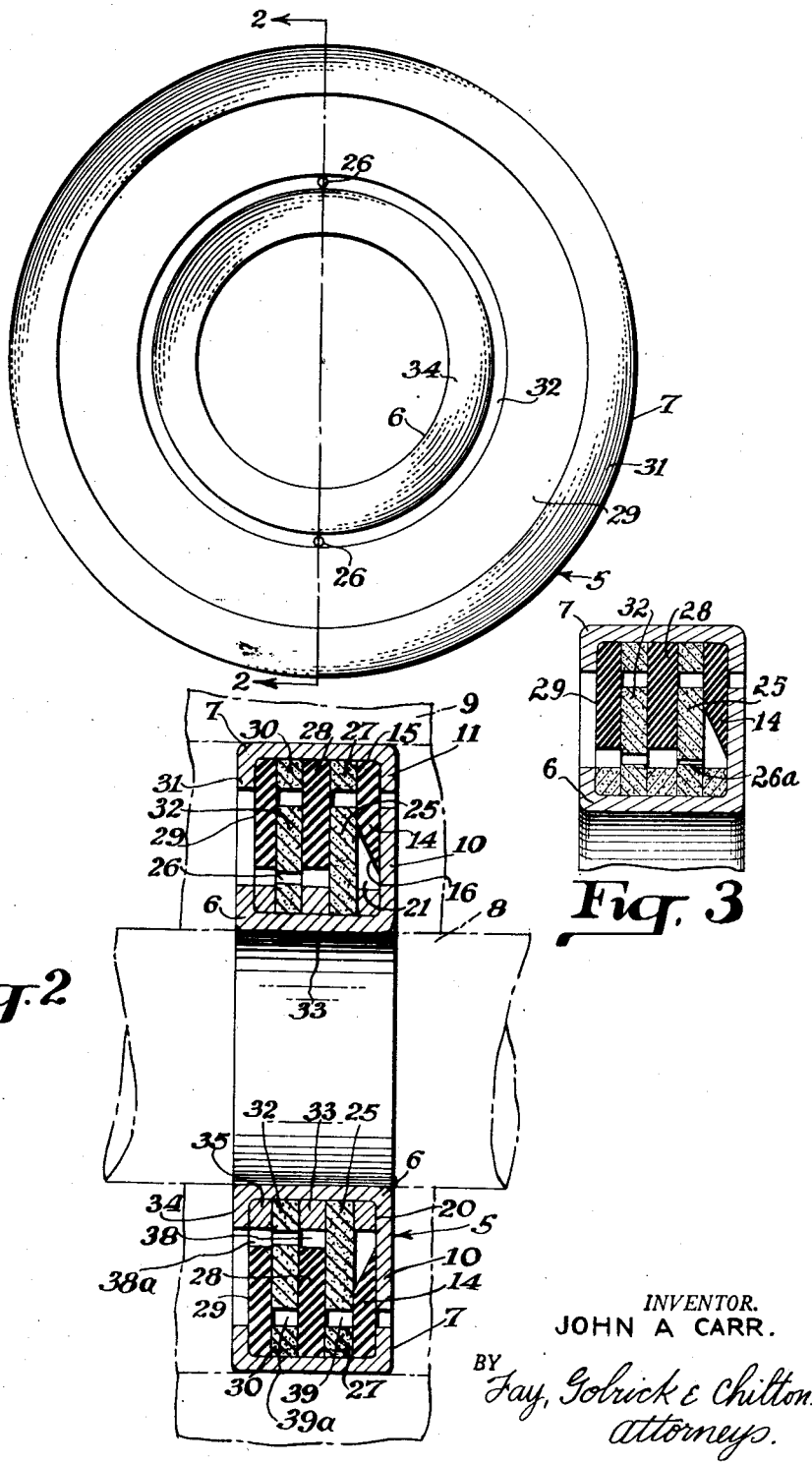

2,554,488

UNITED STATES PATENT OFFICE 2,554,488

SEAL FOR BEARINGS AND THE LIKE

John A. Carr, Portland, Oreg.

Application June 16, 1945, Serial No. 599,883

6 Claims. (Cl. 286—9)

The present invention relates to an improved seal and more particularly to a seal adapted to be interposed between relatively rotating members, such as a shaft and a housing in which the shaft is journalled, the seal being effective to retain fluids from escaping the housing between the housing walls and the shaft and to prevent the entrance of foreign matter into the housing.

An object of the present invention is to provide a seal of the character described in which the seal will prevent the passage of oil under relatively high pressure and in which the pressure of the oil affects the seal to render it more effective as the pressure increases.

Another object of the present invention is to provide a seal of the character described in which internal frictionally engaged members are lubricated for prolonging the lives of these members and for rendering certain of the members responsive to the oil pressures to which the seal is subjected.

A further object of the invention is to provide a seal of the character described in which at least two sealing elements frictionally engage one another, one of the elements being formed of relatively porous material whereby oil may percolate therethrough for lubricating the confronting surfaces of the elements and form an air tight seal.

Still another object of the invention is to provide a seal which is effective to prevent grit and the like from entering therein at one side and for retaining oil under high pressure on the opposite side.

Other objects and advantages of the invention will be apparent from the following description of preferred forms of embodiments of the invention, reference being had to the accompanying drawings wherein:

Fig. 1 is a view in elevation of a seal embodying my invention;

Fig. 2 is a view in section taken on line 2—2 of Fig. 1; and Fig. 3 is a fragmentary view similar to that of Fig. 2 but showing a modified structure.

Referring to the drawings, I have shown a seal 5 embodying my invention. The seal is particularly suitable for forming an oil and air seal between an axle and the hub of a wheel or the like rotating on the axle and where it is desirable to maintain oil under pressure inside the hub and to exclude grit and other foreign matter from the hub. It is to be understood, however, that the invention may be embodied in other forms, the form shown being but two preferred embodiments thereof.

The seal comprises two concentrically arranged annular retaining bands 6 and 7, which may be formed of steel. The band 6 is adapted to be press fitted to an axle, for example, indicated by the dotted lines at 8, and the band 7 may be press fitted in the opening of a hub, for example, indicated at 9. It is to be understood that the seal may be used for different applications, as for example, between a shaft and the walls of an opening in a housing into which the shaft extends.

In forming the seal, one end portion of the band 6 is provided with a flange 10 thereabout, and the band 7 has a flange 11 which extends toward flange 10 and in the same plane. A resilient, flexible ring 14, which is preferably formed of a rubber-like, oil resistant material, such as neoprene, is placed intermediate the bands 6 and 7. The periphery 15 of the ring 14 abuts the outer band 7 and the inner, free edge of the ring 14 is spaced from the band 6. A sloping surface 16 is preferably on the ring 14, which surface slopes to the outer surface of the ring which extends along the flange 10 in abutting relation therewith. Thus, the cross-sectional area of the ring preferably decreases toward the free edge thereof and provides increased flexibility of the ring and it also provides a surface against which fluid pressure may be effective to press the outer edge of the ring against flange 10. However, because of the flexible nature of the material, the sloping surface 16 may be omitted or modified. In any event the fluid pressure inside the seal will force the flexible ring 14 into tight contact with the inner surfaces of 10 and 11.

A spacer ring 20 is next tightly placed around the band 6 in close contact with the inner face of 10. Preferably, the ring 20 is formed of a rigid material such as steel, or it may be formed of iron or copper powder compressed and sintered in a mold. The periphery of ring 20 is spaced from the free edge of ring 14 and a recess 21 is formed therebetween.

Next, a ring 25 is placed about band 6, abutting the spacer ring 20, and the outer surface thereof abuts the inner surface of ring 14. Preferably, the ring 25 is formed of a relatively porous material, such as powdered metal, such as iron or copper, or copper alloy, compressed in a mold and sintered, so that oil may percolate therethrough and provide well lubricated bearing surfaces.

A spacer ring 27, similar to ring 20, is then tightly inserted within the band 7 against ring 14, and a ring 28, formed of material similar to that of which ring 14 is formed, is placed against the ring 27. The inside and outside diameters of ring 28 is the same as ring 14, but the radially extending surfaces of ring 28 are parallel.

In this manner, the seal is built up so that the band 7 carries resilient rings 14, 28 and 29 spaced apart by spacer rings 27 and 30, it being understood that the ring 29 is similar to ring 28 and that the spacer rings 27 and 30 are preferably formed of steel, although they may be formed of powdered metal compressed and sintered, and the band 6 carries relatively porous rings 25 and 32 spaced by spacer rings 20, 33 and 35 so that the porous rings extend between the resilient rings 14, 28 and 29 and are in frictional engagement therewith. The porous ring 32 is similar to ring 25 and the spacer rings 20, 33 and 35 are of material similar to that of spacer rings 27 and 30. This assembly of rings is secured by crimping the inner edges of bands 6 and 7 tightly against the spacer 35 and ring 29, respectively. This secures the ring members to their respective bands 6 and 7, and an impervious seal is formed therebetween so that fluid cannot escape from the seal along the confronting surfaces of the retaining bands. As may be seen, the inner surface of ring 29 is substantially entirely exposed to the pressure within the hub 9.

The relatively rigid outer rings 27, 30 are thus sandwiched between the outer edges of flexible rings 14, 28, 29. Of the latter, 28 is in turn sandwiched between porous rings 25 and 32, and one surface of ring 29 is in frictional contact with the confronting surface of 32. Likewise, one surface of 14 is in frictional contact with the confronting surface of ring 25 and the other surface is in frictional contact with the inner confronting surface of 10.

When oil pressure is applied to the inner face of the seal, and therefore to the exposed surface of ring 29, the latter ring is tightly pressed against rings 30 and 32. Oil enters the annular space 38a and by its pressure impregnates the porous ring 32 so that pockets of oil will be present on the surface of the ring, thereby imparting good bearing properties to it. Likewise oil percolates through the porous ring 32 into the annular spaces 39a, and through ring 25 and into the space 21, imparting bearing and sealing pressures to the flexible members 28 and 14. If desired, small holes 26 may be drilled through ring 32 to facilitate full impregnation of the entire seal with oil, and in some cases it may be desirable to drill small holes through ring 25 as illustrated at 26a in Fig. 3, but ordinarily the drilling of the holes 26 will suffice. The diameters of the holes shown at 26a may be smaller than appears in the drawing.

Thus, the pressure of the oil, by percolating through the porous rings, not only maintains a substantial film of lubricant between the confronting rubbing and bearing surfaces of the flexible rubber-like rings and the porous rings and the outer flange 10, but also compacts the rings together to prevent substantial leakage of oil to the outside and of foreign matter in the bearings.

In making up my seal I may omit the rings 29, 32 and 35 in which case I will have a smaller seal with a lesser area of sealing, bearing surfaces, or I may employ an additional set or sets of members, each set corresponding to 29, 32, 35, thus increasing the bearing, sealing surfaces within the seal.

Thus, it is apparent that I have provided a seal that is easily manufactured and which will form a seal for retaining oil and air or other gases from escaping between two relatively moving members, and which will exclude dirt, grit and other foreign matter from entering between such members. Furthermore, the seal is particularly effective where subjected to pressure differentials between opposite sides thereof.

Although I have described but two forms of the invention other forms may be adopted, all coming within the scope of the claims which follow.

I claim:

1. A pressure oil seal between rotor and stator members having an annular space therebetween comprising, a plurality of relatively rigid ring elements secured to one of said members and extending radially toward the other of said members, said elements being spaced apart; and a plurality of resilient, oil resistant rubber-like ring elements secured to the other of said members and extending toward said one member whereby a resilient ring extends intermediate two adjacent rigid rings, said rigid rings having openings therein forming lubricant conducting channels from one side of the seal to the spaces intermediate said one member and the free edge of the resilient rings.

2. A pressure oil seal between rotor and stator members having an annular space therebetween comprising, a plurality of relatively rigid ring elements secured to one of said members and extending radially toward the other of said members, said elements being spaced apart; and a plurality of resilient, oil resistant, rubber-like ring elements secured to the other of said members and extending toward said one member whereby a resilient ring extends intermediate two adjacent rigid rings, one of the outer of said resilient rings having its outer, radially extending surface abutting a rigid ring and having a surface sloping from the outer surface inwardly.

3. A pressure oil seal between rotor and stator members having an annular space therebetween comprising, a plurality of relatively rigid ring elements secured to one of said members and extending radially toward the other of said members, said elements being spaced apart; and a plurality of resilient, oil resistant, rubber-like ring elements secured to the other of said members and extending toward said one member whereby a resilient ring extends intermediate two adjacent rigid rings, one of the outer of said resilient rings having its outer, radially extending surface abutting a rigid ring and having a surface sloping from the outer surface inwardly; and means forming a fluid passage to the space between said sloping surface and said one member extending from without the seal.

4. A pressure oil seal between rotor and stator members having an annular space therebetween, one of said members having a pair of spaced, relatively rigid ring-like elements attached thereto and extending radially toward the other of said members; and a resilient, flexible ring of oil resistant rubber-like material attached to said other member and extending intermediate said pair of ring-like elements and having one surface lying along a surface of one of said pair of rings, the extended edge of said flexible ring being spaced from the first mentioned member, one of the surfaces of said flexible ring sloping toward said one surface and from said other member whereby said sloping surface presents an area of increasing flexibility toward the free edge of said flexible ring; and means forming an oil passage to the space intermediate said pair of ring-like elements extending from without the seal.

5. A pressure oil seal between rotor and stator members having an annular space therebetween comprising, two ring-like elements spaced apart and secured to one of said members and extending radially toward the other member; and a flexible oil impervious ring-like element attached to the other of said members and extending intermediate said two elements in frictional engagement therewith and terminating short of the first mentioned member whereby an oil chamber is formed intermediate said two elements and the periphery of said flexible element, one of said two elements having an oil passage whereby oil under pressure may be conducted into said chamber and act on said flexible member.

6. A pressure oil seal between rotor and stator members having an annular space therebetween comprising, two ring-like elements spaced apart and secured to one of said members and extending radially toward the other member; and a flexible oil impervious ring-like element attached to the other of said members and extending intermediate said two elements in frictional engagement therewith and terminating short of the first mentioned member whereby an oil chamber is formed intermediate said two elements and the periphery of said flexible element, the peripheral portion of said flexible element tapering toward one of said two elements, and the other of said two elements having an oil passage whereby oil under pressure may be conducted into said chamber and act on said flexible member.

JOHN A. CARR.

REFERENCES CITED

The following references are of record in the file of this patent:

UNITED STATES PATENTS

| Number | Name | Date |
| --- | --- | --- |
| 395,087 | Stearns | Dec. 25, 1888 |
| 955,332 | Hicks | Apr. 19, 1910 |
| 1,718,175 | Nilson | June 18, 1929 |
| 1,895,348 | Schlegel et al. | Jan. 24, 1933 |
| 1,930,312 | Greenhoe | Oct. 10, 1933 |
| 2,124,526 | Goldsworthy | July 26, 1938 |
| 2,245,475 | Hately | June 10, 1941 |

FOREIGN PATENTS

| Number | Country | Date |
| --- | --- | --- |
| 546,260 | Great Britain | of 1942 |